(12) United States Patent
Peltola

(10) Patent No.: US 6,748,221 B1
(45) Date of Patent: Jun. 8, 2004

(54) METHOD AND SYSTEM FOR CHANNEL ALLOCATION IN DUAL BAND NETWORK

(75) Inventor: Jukka Peltola, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/567,070

(22) Filed: May 8, 2000

Related U.S. Application Data

(63) Continuation of application No. PCT/FI99/00731, filed on Sep. 9, 1999.

(30) Foreign Application Priority Data

Sep. 10, 1998 (FI) .................................................. 981942

(51) Int. Cl.$^7$ ................................................. H04Q 7/20
(52) U.S. Cl. .................. 455/450; 455/452.1; 455/552.1
(58) Field of Search ................................. 455/450, 436, 455/437, 438, 439, 452, 453, 552, 553, 444, 67.1, 226.1, 226.2, 552.1, 452.1; 370/331, 332, 401, 402

(56) References Cited

U.S. PATENT DOCUMENTS

| | | | |
|---|---|---|---|
| 5,175,867 A | | 12/1992 | Wejke et al. |
| 5,483,669 A | | 1/1996 | Barnett et al. |
| 5,722,072 A | | 2/1998 | Crichton et al. |
| 5,857,153 A | * | 1/1999 | Lupien ........................ 455/436 |
| 5,960,354 A | * | 9/1999 | Einola ......................... 455/454 |
| 6,134,443 A | * | 10/2000 | Spann et al. ................. 455/450 |
| 6,259,915 B1 | * | 7/2001 | Raith .......................... 455/434 |
| 6,546,252 B1 | * | 4/2003 | Jetzek et al. ................. 455/437 |

FOREIGN PATENT DOCUMENTS

| | | |
|---|---|---|
| WO | 0 505 341 | 9/1992 |
| WO | WO 96/33587 | 10/1996 |
| WO | WO 96/37084 | 11/1996 |
| WO | WO 98/21908 | 5/1998 |

\* cited by examiner

*Primary Examiner*—Jean Gelin
(74) *Attorney, Agent, or Firm*—Squire, Sanders & Dempsey L.L.P.

(57) ABSTRACT

The invention relates to a method for a channel allocation in a dual band network which dual band network comprises at least one base station of a serving cell, at least one base station of a neighbour cell and at least one subscriber terminal in radio connection with the base station of the serving cell, which subscriber terminal can be in connection with the base station of the serving cell either on the first or on the second radio band, which radio connection comprises at least one broadcast control channel, which broadcast control channel is only transmitted on the first band, which subscriber terminal carries out measurements of the serving cell and neighbour cells on the first ban, and the measurement result of the subscriber terminal on the second band is estimated on the basis of the measurements on the first band, and in which the connection between the subscriber terminal and the base station is established on the second band if the measurement result on the first band is bigger than a predetermined threshold value. The invention is characterized by dynamically adjusting the predetermined threshold value by observing the measurement results before and after establishing the connection to the other band. Thus, the performance of the base station system can be efficiently improved.

20 Claims, 2 Drawing Sheets

METHOD AND SYSTEM FOR CHANNEL ALLOCATION IN DUAL BAND NETWORK

This application is a con of PCT/FI99/00731 Sep. 9, 1999.

FIELD OF THE INVENTION

The invention relates to a method for a channel allocation in a dual band network which dual band network comprises at least one base station of a serving cell, at least one base station of a neighbour cell and at least one subscriber terminal in radio connection with the base station of the serving cell, which subscriber terminal can be in connection with the base station of the serving cell either on the first or on the second radio band, which radio connection comprises at least one broadcast control channel which broadcast control channel is only transmitted on the first band, which subscriber terminal carries out measurements of the serving cell and neighbour cells on the first band and the measurement result of the subscriber terminal on the second band is estimated on the basis of the measurements on the first band, and in which the connection between the subscriber terminal and the base station is established on the second band if the measurement result on the first band is bigger than a predetermined threshold value.

The invention also relates to a system for a channel allocation in a dual band network, which dual band network comprises at least one base station of a serving cell, at least one base station of a neighbour cell and at least one subscriber terminal in radio connection with the base station of the serving cell, which subscriber terminal is in connection with the base station of the serving cell either on the first or on the second radio band, which radio connection comprises at least one broadcast control channel, which system is arranged to transmit the broadcast control channel only on the first band, which subscriber terminal is arranged to report on the measurements of the serving cell and neighbour cells on the first band and which system is arranged to estimate the measurement result on the second band on the basis of the measurements on the first band.

BACKGROUND OF THE INVENTION

As the use of mobile phones and other subscriber terminals is growing all the time, the capacity of networks has to be constantly increased. This involves high costs because of frequency planning and various measurements. The costs of the increased network capacity are also largely due to the fact that more transmitter-receivers have to be bought for base stations and on the other hand that more base station sites are needed.

The first GSM specification was published in 1990 and the first services were announced in 1991. Due to the exponential growth in the number of mobile phone users, the traditional GSM network is already being largely congested in the centres of big cities in particular, whereby call congestions occur, which means that all channels are already reserved. On this account, so-called Dual Band phones, i.e. mobile phones using two networks, have been developed, which phones include both a GSM phone and the radio part and functions of the new GSM 1800 phone. Thus, both GSM 900 and GSM 1800 are combined as one phone. It is also much cheaper for the operator to increase the network capacity by using already existing base station sites than by building new sites. And this is the biggest advantage of the dual band network: new GSM 1800 base stations can be located in already existent sites.

The digital GSM 1800 network, previously called DCS 1800 (Digital Cellular System) network, has similar features as GSM 900. In the dual band network, a manifold number of radio channels can be included in the same area compared with only the GSM area of 900 megahertz. It is most reasonable to build a GSM 1800 network in the areas where there is a lot of telephone traffic and where the GSM 900 network is most congested.

In order to ensure the functioning of the system, the current GSM 900/GSM 1800 —based cellular radio networks require a careful frequency planning whose costs are relatively high. In the dual band networks of the latest technology, each band usually has its own Broadcast Control Channel (BCCH). This is advantageous to a designer, but in practice the other broadcast control channel only wastes capacity. A subscriber terminal only needs one measurement result from each cell to get enough timing information for handovers and to decide on the cell re-selection. On the other hand, if only one broadcast control channel is used, this traditional method only concludes the predetermined choice between the GSM 900 and GSM 1800 bands and, when the signal level of the GSM 900 is higher than a permitted threshold value, directs the calls to the GSM 1800 band.

A problem of the arrangement described above is for example that the tuning of the threshold value is time-consuming and difficult. If the given threshold value is too high, the capacity of the GSM 1800 cannot be fully utilized, because a channel has not been allocated from the GSM 1800 band to a subscriber terminal although it would be capable of using it. On the other hand, if the threshold value is too low, subscriber terminals are commanded to move to the GSM 1800 frequencies although they do not "survive" there. This is manifested in poor quality and the increased signalling load of the network because of the repeated intra-cell handover attempts and returns resulting from what is described above.

BRIEF DESCRIPTION OF THE INVENTION

It is thus an object of the invention to provide a method and a system implementing the method to eliminate the above problems. This is achieved by the type of method described in the introduction which is characterized by dynamically adjusting the predetermined threshold value by observing the measurement results before and after establishing the connection to the other band. The system of the invention is characterized in that the system is arranged to use a predetermined threshold value for a desired feature in selecting a band of the traffic channel used for a base station call in the dual band network, which system is arranged to set the threshold value automatically for optimal performance.

The preferred embodiments of the invention are disclosed in the dependent claims.

In the method of the invention, the changing of the band is smooth and interruptions do not occur in calls. Same features and services as in prior art methods are available on both bands, and all network elements, except the traditional base stations, are entirely in accordance with the prior art. In the dual frequency band, the capacity is increased by connecting the GSM 1800 network to the already existing 900 network. The GSM dual band network can be preferably implemented in the city areas which are highly congested because of the increase in capacity. Further, the development in the dual band network requires only suitable base stations and programming.

The method of the invention is based on the fact that in the dual band network transmitting the broadcast control channel at one frequency, the subscriber terminal can report on the measurement results of the neighbour cells only from one band, which is most commonly the GSM 900. On this account, the estimation of the signal level on the other band (most commonly the GSM 1800) has to be based on the results of the GSM 900 band with a broadcast control channel. The method allows the system to automatically adapt to the predetermined threshold values in such a manner that the GSM 1800 frequencies can be loaded with a maximum amount of traffic by simultaneously releasing as much GSM 900 capacity as possible.

The method of the invention for optimizing the system performance of the real network environment provides a plurality of advantages. A big advantage is that the performance of the base station system can be efficiently improved. The principle is applicable even though the amount of output power for 900 MHz and 1800 MHz carrier waves is different. The efficiency and capacity of the dual band network grow. The system carries out automatically the fine tuning of the parameter which takes care of the allocation of the traffic between the GSM 900 and GSM 1800 bands.

The method allows the system to operate automatically with optimum values. Fine tuning aims at attaining the desired objective which can be set to optimize either the quality or the capacity. All potential changes in the environment reflect automatically to the threshold values.

System planning is easier also because the operator only needs to set a sufficiently reliable starting value, after which the system takes care of the rest and the fine tuning.

The system of the invention provides the same advantages as the method described above. It is obvious that the preferred embodiments and the detailed embodiments can be joined together as different combinations in order to accomplish the desired technical efficiency.

BRIEF DESCRIPTION OF THE DRAWINGS

The invention is now described in greater detail in connection with the preferred embodiments with reference to the attached drawings, in which.

DETAILED DESCRIPTION OF THE INVENTION

Figure 1:
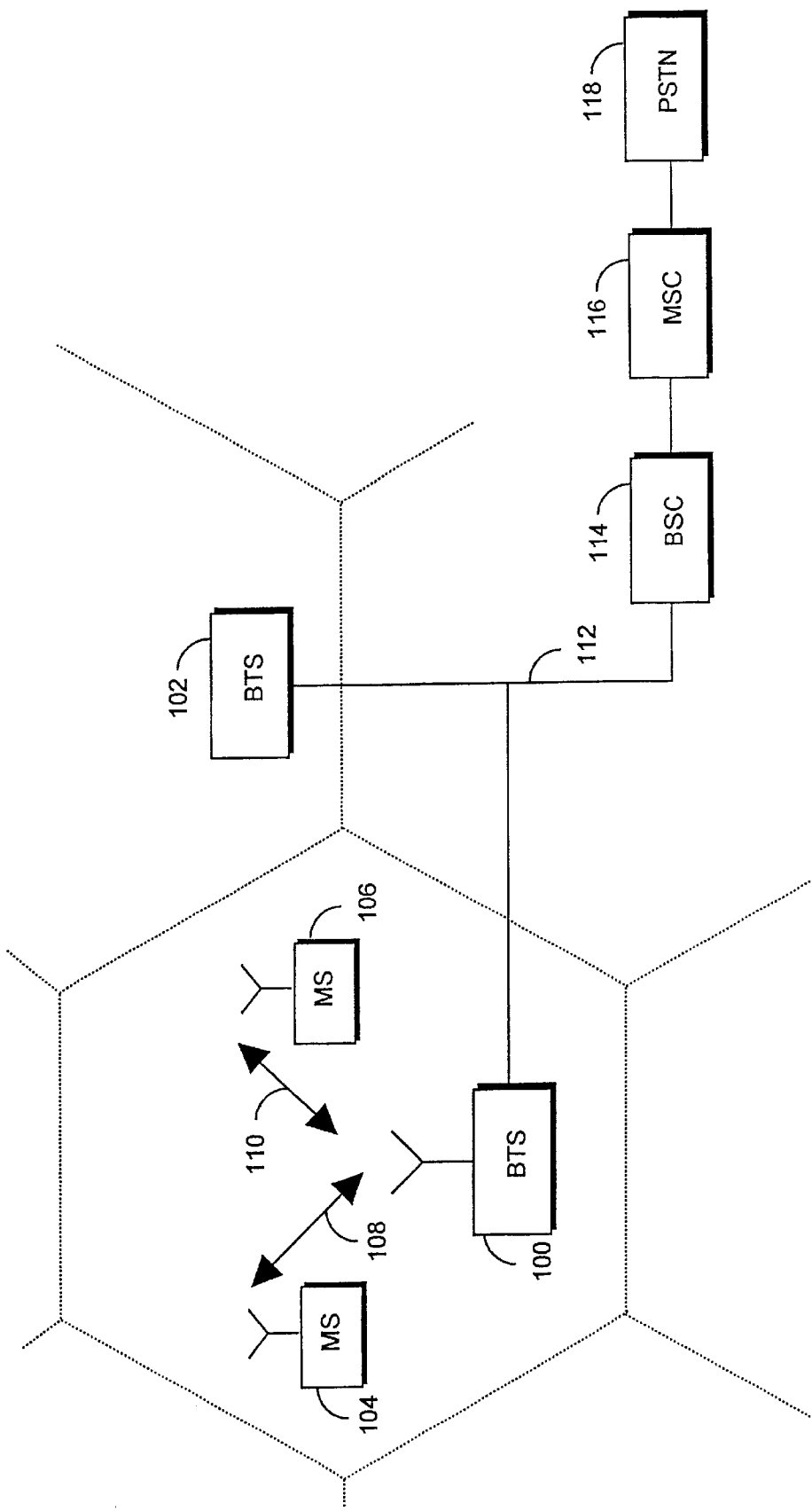
FIG. 1 shows a cellular radio network.

In the following the invention is described by way of example in the GSM 900 and GSM 1800 environments yet without restricting thereto. FIG. 1 shows an example of a structure of the cellular radio network of the invention. FIG. 1 only includes subject matter that is relevant to the description of the invention, but it is apparent to a person skilled in the art that the common cellular radio network also includes other functions and structures which need not be herein further described.

Base stations 100, 102 have a certain coverage area, i.e. a cell. The base stations 100, 102 are in connection with a base station controller 114 by means of a trunk circuit 112. Several base stations 100, 102 are in turn concentratedly controlled by the base station controller 114 in connection with them. The base station controller 114 establishes the connection with a subscriber terminal 104, 106 by requesting the base station 100 to transmit a message to the subscriber terminal 104, 106 in order to establish the connection. Usually, there is a connection from the base station controller 114 to a mobile services switching centre 116, from which there is a further connection to a fixed telephone network 118. In office systems, the functions of the base station 100, of the base station controller 114 and even of the mobile services switching centre 116 can be combined in one apparatus, from which there is a connection to the fixed network 118, e.g. to a switching centre of the fixed network 118. The base stations 104, 106 located in the cell have a bidirectional radio connection 108, 110 with the base station 100 of the cell, in which radio connection 108, 110 radio signals are transmitted at a certain carrier wave frequency. The subscriber terminals 104, 106 may be fixed, vehicle-mounted or portable mobile terminals. Further, the network part, i.e. the fixed part of the cellular radio network, may comprise more base stations, base station controllers, transmission systems and various network management systems.

In order to meet the requirements concerning the capacity, reliability, flexibility and profitableness of the GSM networks, new methods are constantly under development. One solution for increasing the capacity is the dual band network. The GSM 1800 network is a derivative of the GSM 900 technology. The GSM 1800 operates in the 1800 MHz frequency area. The GSM 900/GSM 1800 dual frequency band technology is an ideal opportunity for the operators to increase the capacity in the areas of high traffic in particular. The GSM 900 bandwidth is used for building the basic coverage area, whereby the GSM 1800 can increase the capacity e.g. when occasional peaks and traffic growth occur. The broader frequency band and a smaller cell size of the GSM 1800 increase the capacity, allows a higher traffic density and makes the frequency planning more flexible.

Figure 2:
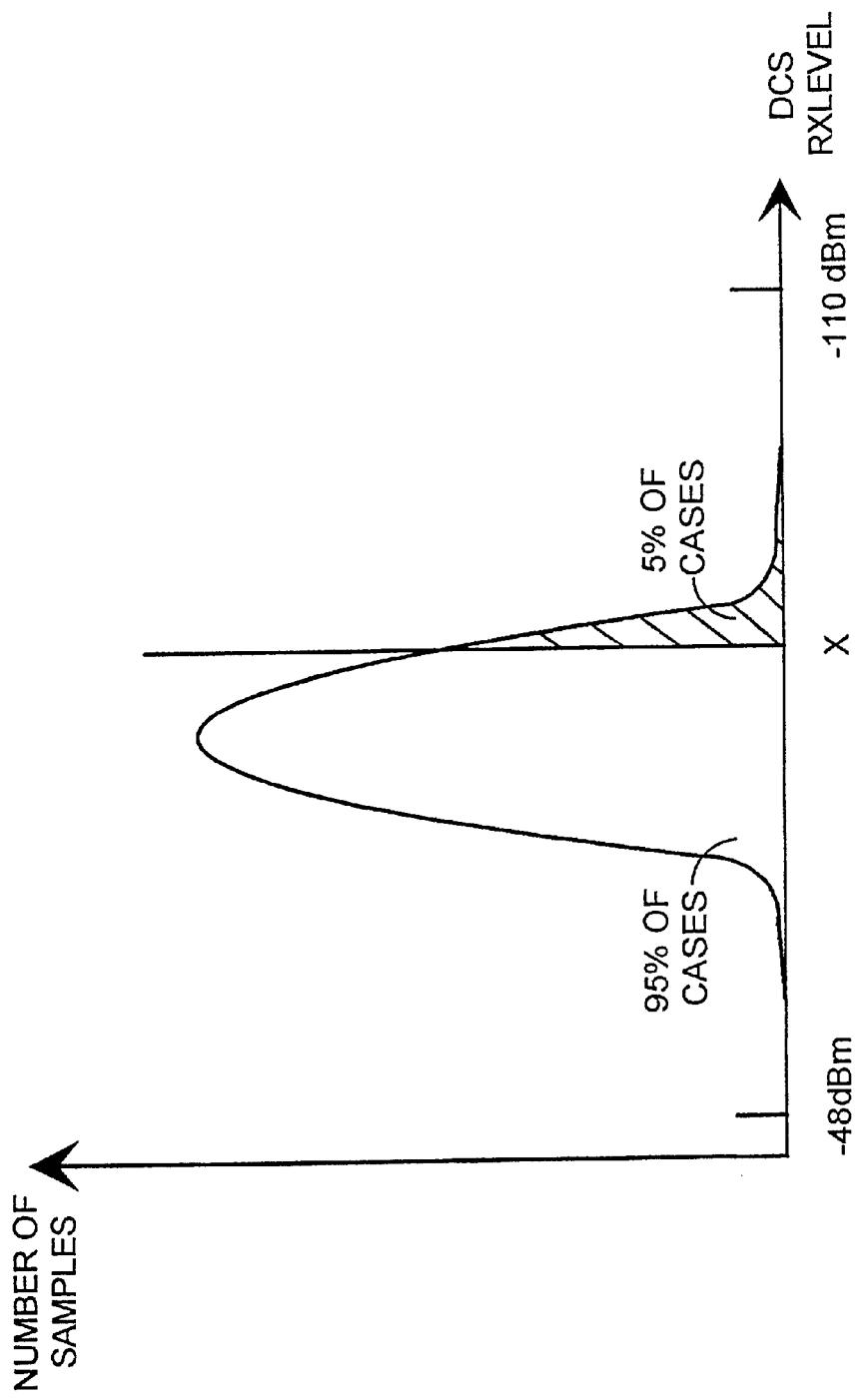
FIG. 2 shows a change in the reception power level based on probability calculus.

Theoretically, the differential between the signal strengths of the GSM 900 and GSM 1800 frequencies is 6 dB at the same point. This is the case when the signals are transmitted from the same place, i.e. when both the GSM 900 and the GSM 1800 transmitters are located at the same site. In practice, the differential varies a lot. The numerical value of the differential depends on the prevailing situation and the environment. When monitoring the strength of a received signal before and after the signal has been commanded to move to the GSM 1800 band, dispersion in the GSM 1800 signal levels can be observed even though the command to move to the GSM 1800 band is always given after a certain GSM 900 threshold value x is achieved. FIG. 2 illustrates what the above mentioned dispersion could in practice look like. If the GSM 900 reception power level GSM 900 Rxlevel is observed before and the GSM 1800 reception power level GSM 1800 RxLevel is observed after the command to move to the GSM 1800 band, a similar dispersion, but with a different mean value, is obtained for each GSM 900 reception power level GSM 900 RxLevel. The idea of the invention is to control the reception power levels RxLevel before and after the command to move to the GSM 1800 band, and to automatically arrange the threshold value x for the GSM 900 signal level in such a manner that after the command to move to the GSM 1800 band, the desired percentage of the cases have a reception power level which is higher or at least as high as the desired target value y for the GSM 1800 signal level.

In the initialisation of the method, a user sets a relatively safe and clear initial value for the threshold value x, after which the system tunes the threshold value x to reach the desired end result y. In other words, the system is commanded to find the threshold value x, which leads to the GSM 1800 band reception power level GSM 1800 RxLevel which is higher or at least as high as the desired value for the reception power level GSM 1800 RxLevel in the desired percentage of cases. The desired percentage of cases equals 95% in FIG. 2.

A similar method can also be applied to calculating the quality or the combined threshold value x' of the reception power level and the quality, instead of the threshold value x for the reception power level RxLevel. The objective can also be set in such a manner that a certain GSM threshold value x" would lead to the desired quality value.

The dual band network transmitting the broadcast control channel at one frequency requires an arrangement in which both the GSM 900 and the GSM 1800 signals are transmitted from the same site. The method of the invention can also be used in handovers between two cells both of which have both GSM 900 and GSM 1800 transmitters. In this case, the receiving base station can select the channel by a similar threshold value mechanism, in which the target channel is selected from the GSM 1800 channel provided that the signal level of the GSM 900 band is sufficient.

Although the invention has been described above with reference to the example according to the attached drawings, it is obvious that the invention is not restricted thereto, but may be modified in a variety of ways within the scope of the inventive idea disclosed in the attached claims.

What is claimed is:

1. A method for a channel allocation in a dual band network, wherein the dual band network comprises at least one base station of a serving cell, at least one base station of a neighbor cell and at least one subscriber terminal in radio connection with the at least one base station of the serving cell, comprising:
    connecting at least one subscriber terminal with at least one base station of a serving cell either on a first radio band or on a second radio band;
    providing a radio connection comprising at least one broadcast control channel;
    transmitting the at least one broadcast control channel only on the first radio band;
    using the at least one subscriber terminal to carry out measurements of the at least one base station of the serving cell and neighbor cells on the first radio band and to estimate measurement results of the at least one subscriber terminal on the second radio band based on the measurements of the first radio band;
    establishing the radio connection between the at least one subscriber terminal and the base station on the second radio band if the measurement result on the first radio band exceeds a predetermined threshold value; and
    dynamically adjusting the predetermined threshold value by observing the measurement results before and after establishing the radio connection to the second radio band.

2. A method as claimed in claim 1, further comprising:
    first establishing the radio connection between the at least one subscriber terminal and the at least one base station on the first radio band;
    comparing, by a base station controller, channel measurement results of the at least one subscriber terminal after the radio connection has been established;
    storing the comparison of the channel measurement results; and
    adjusting the predetermined threshold value based on the stored comparison results.

3. A method as claimed in claim 2, further comprising adjusting the predetermined threshold value based on the comparison of the channel measurement results in such a manner that the channel measurement results of the subscriber terminal on the second radio band is a certain probability higher or as high as a predetermined targeted measurement result.

4. A method as claimed in claim 1, further comprising performing a handover to another radio band after the predetermined threshold value is exceeded.

5. A method as claimed in claim 1, further comprising measuring at least one of a signal power and a signal quality before and after establishing the radio connection to the second radio band.

6. A method as claimed in claim 1, further comprising:
    using the predetermined threshold value for a desired feature in a radio band selection of a dedicated channel used for the radio connection;
    setting an initial value for which the predetermined threshold value is set as safe as possible when initializing the method; and
    automatically calculating the predetermined threshold value to achieve the optimal performance of the method.

7. A method as claimed in claim 1, further comprising calculating the predetermined threshold value for quality.

8. A method as claimed in claim 1, further comprising calculating the predetermined threshold value for a reception power level.

9. A method as claimed in claim 1, further comprising using the method in an intra-cell handover.

10. A method as claimed in claim 1, further comprising using the method in an inter-cell handover.

11. A system for a channel allocation in a dual band network, wherein the dual band network comprises at least one base station of a serving cell, at least one base station of a neighbor cell and at least one subscriber terminal in radio connection with the base station of the serving cell, the system comprising:
    at least one subscriber terminal being in connection with at least one base station of a serving cell either on a first radio band or on a second radio band;
    a radio connection comprising at least one broadcast control channel;
    wherein the system is configured to transmit a broadcast control channel only on the first radio band;
    wherein the at least one subscriber terminal is configured to report on measurements of the serving cell and neighbor cells on the first radio band and wherein the system is configured to estimate a measurement result on the second radio band based on the measurements of the first radio band; and
    wherein the system is configured to use a predetermined threshold value for a desired feature in selecting a band of a traffic channel used for a base station call in a dual band network and the system is configured to set the predetermined threshold value automatically for an optimal performance.

12. A system as claimed in claim 11, wherein the at least one subscriber terminal and the at least one base station are configured to establish the radio connection between the at least one subscriber terminal and the at least one base station on the first radio band, and wherein a base station controller is configured to compare channel measurement results of the at least one subscriber terminal after the radio connection has been established, to store the comparison of the channel measurement results and to adjust the predetermined threshold value based on the stored comparison results.

13. A system as claimed in claim 12, wherein the system is configured to adjust the predetermined threshold value based on the comparison of the channel measurement results in such a manner that the channel measurement result of the subscriber terminal on the second radio band is a certain probability higher or as high as a given targeted measurement result.

14. A system as claimed in claim 11, wherein the system is configured to carry out a handover to another radio band after the predetermined threshold value is exceeded.

15. A system as claimed in claim 11, wherein the system is configured to measure at least one of a signal power and a signal quality before and after establishing the radio connection to the second radio band.

16. A system as claimed in claim 11, wherein the system is configured to use the determined threshold value for a desired feature in a radio band selection of a dedicated channel used for the radio connection, and to set the initial value for the predetermined threshold value as safe as possible when initializing the method, and to calculated the predetermined threshold value automatically to achieve the optimal performance of the system.

17. A system as claimed in claim 11, wherein the system is configured to calculate the predetermined threshold value for quality.

18. A system as claimed in claim 11, wherein the system is configured to calculate the predetermined threshold value for a reception power level.

19. A system as claimed in claim 11, wherein the system is configured to be used in an intra-cell handover.

20. A system as claimed in claim 11, wherein the system is configured to be used in an inter-cell handover.

* * * * *